United States Patent [19]

Bouillot et al.

[11] Patent Number: 4,811,339

[45] Date of Patent: Mar. 7, 1989

[54] NON-CODED INFORMATION AND COMPANION DATA SWITCHING MECHANISM

[75] Inventors: Michel Bouillot, Nice; Jean L. Calvignac, LaGaude; Jean-Marie L. Munier, Cagnes sur Mer, all of France

[73] Assignee: International Business Machines Corp., Armonk, N.Y.

[21] Appl. No.: 33,276

[22] Filed: Apr. 2, 1987

[30] Foreign Application Priority Data

Apr. 30, 1986 [EP] European Pat. Off. ......... 86430016.5

[51] Int. Cl.⁴ .............................................. H04J 3/26
[52] U.S. Cl. ......................................... 370/94; 370/79
[58] Field of Search ...................... 370/60, 85, 89, 94, 370/79

[56] References Cited

U.S. PATENT DOCUMENTS 4,542,498  9/1985  Bodros et al. ...................... 370/60
4,621,359  11/1986  McMillen .............................. 370/60
4,707,826  11/1987  Froggatt ............................. 370/60

FOREIGN PATENT DOCUMENTS 0094322  5/1983  European Pat. Off. .
2310594  12/1976  France .

OTHER PUBLICATIONS

"Design Approaches and Performance Criteria for Integrated Voice/Data Switching".
"Integration of Circuit/Packet Switching by a Senet".

Primary Examiner—Douglas W. Olms
Attorney, Agent, or Firm—Edward H. Duffield

[57] ABSTRACT

Mechanism for allowing data and packetized non coded information NCI such as packetized voice or images, to be exchanged between workstations connected to nodes of a communication network. The workstations arrange the bit stream to be sent into a format of regularly occurring time slots separated by flags. The data only containing time slots begin with a first flag (F2), the NCI only containing and NCI and data containing time slots begin with a second flag (F1) and inside these slots, flag F2 separates the NCI and data portions.

The route between two workstations is established by a data session using the node resources. Once a route is established, the NCI portions of the bit stream are switched using high speed bus 26 and the data portions are routed using the normal data paths.

8 Claims, 9 Drawing Sheets

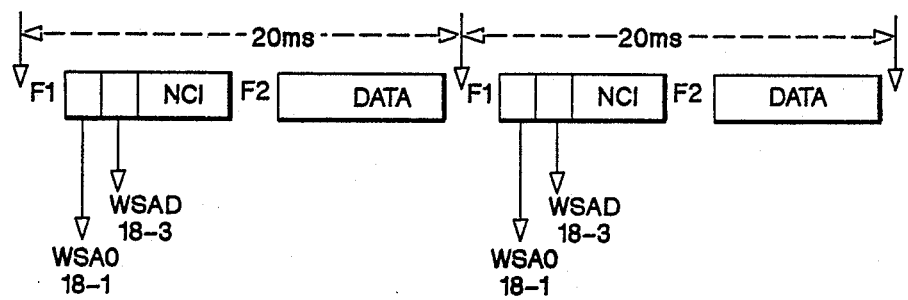

NCI AND DATA EXCHANGE FORMAT
WORK STATION LINK    FIG. 2-A

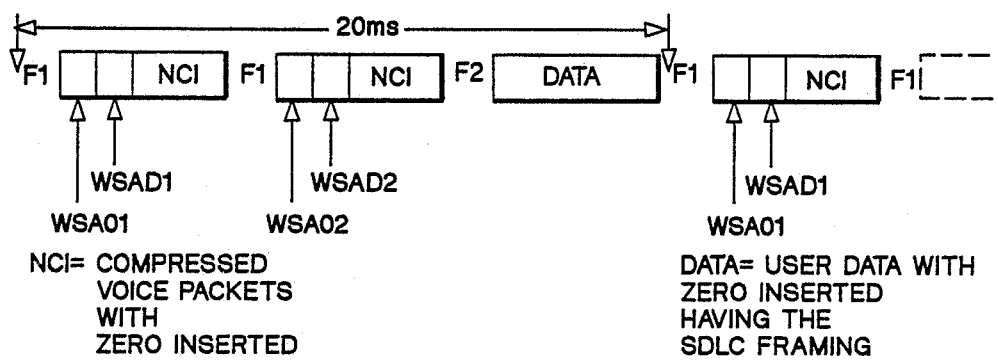

NCI AND DATA EXCHANGE FORMAT
INTERMEDIATE LINK    FIG. 2-B

NCI= COMPRESSED VOICE PACKETS WITH ZERO INSERTED

DATA= USER DATA WITH ZERO INSERTED HAVING THE SDLC FRAMING

MARKING FRAME DATA STRUCTURE
ON WORK STATION LINK    FIG. 2-C

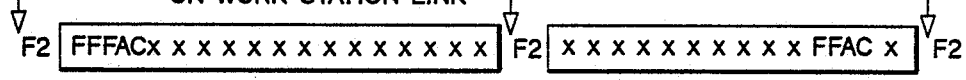

AFTER F2 FLAG CANCELLATION AND ZERO DELETION

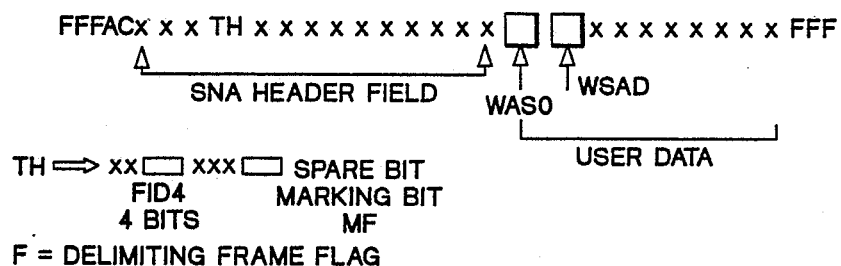

TH ⟹ xx☐ xxx☐ SPARE BIT
        FID4    MARKING BIT
        4 BITS     MF

F = DELIMITING FRAME FLAG

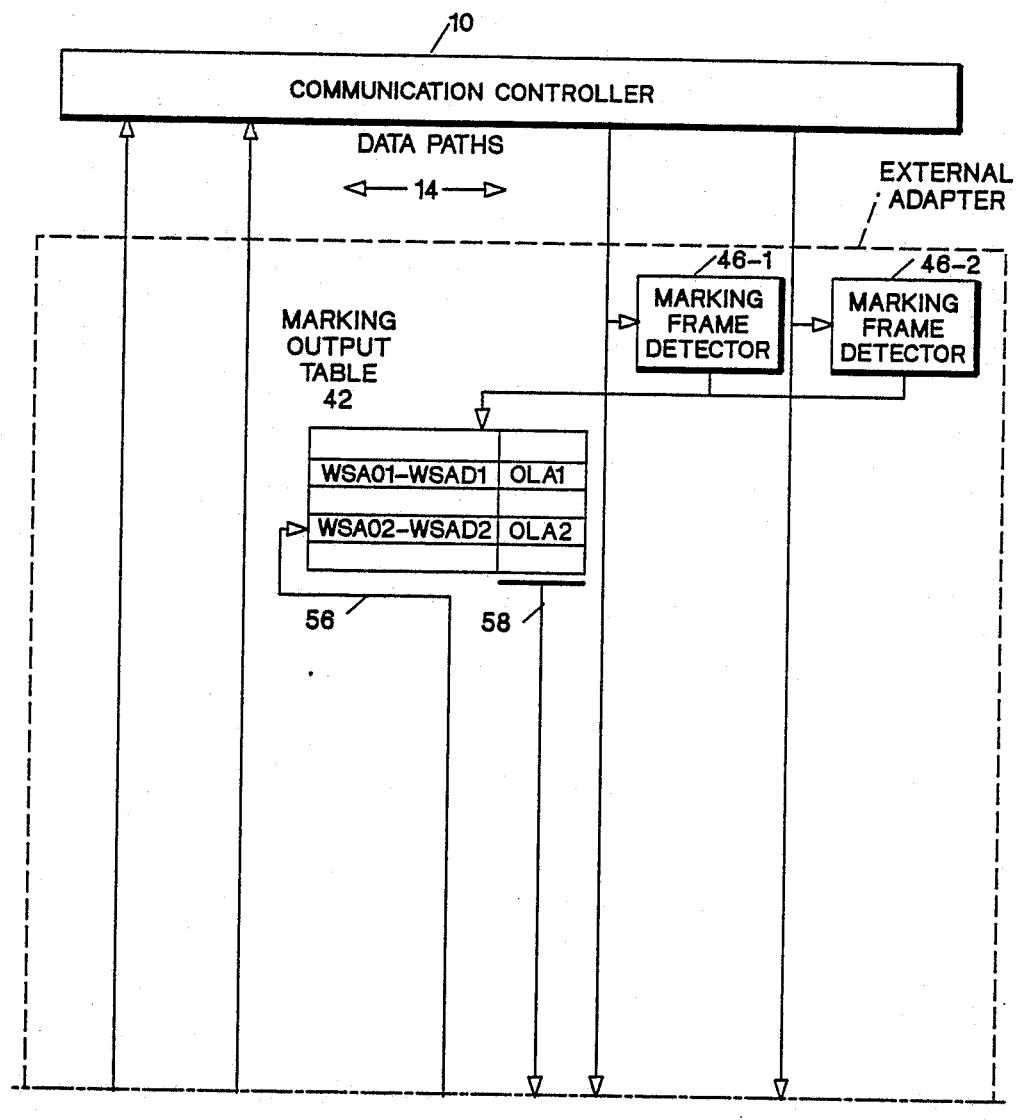

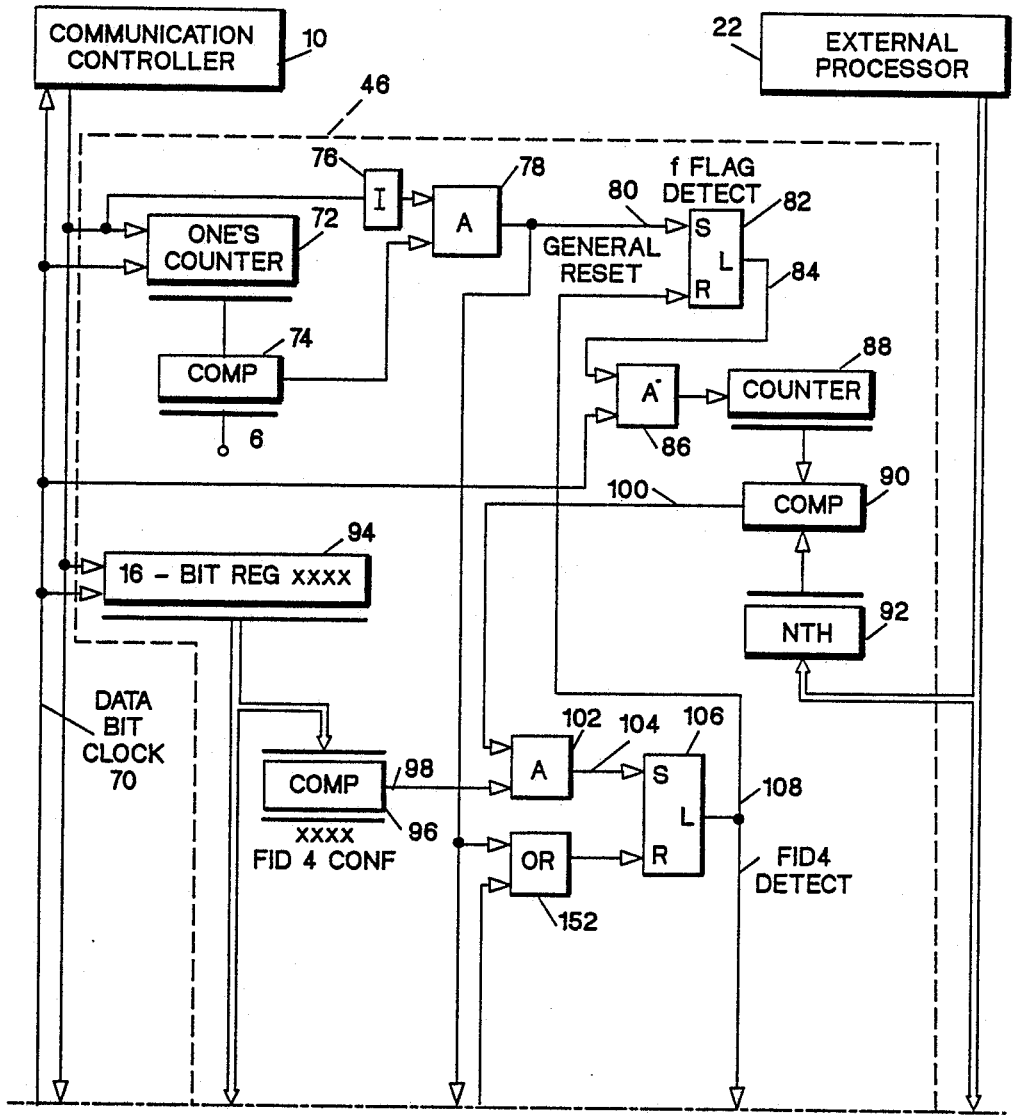

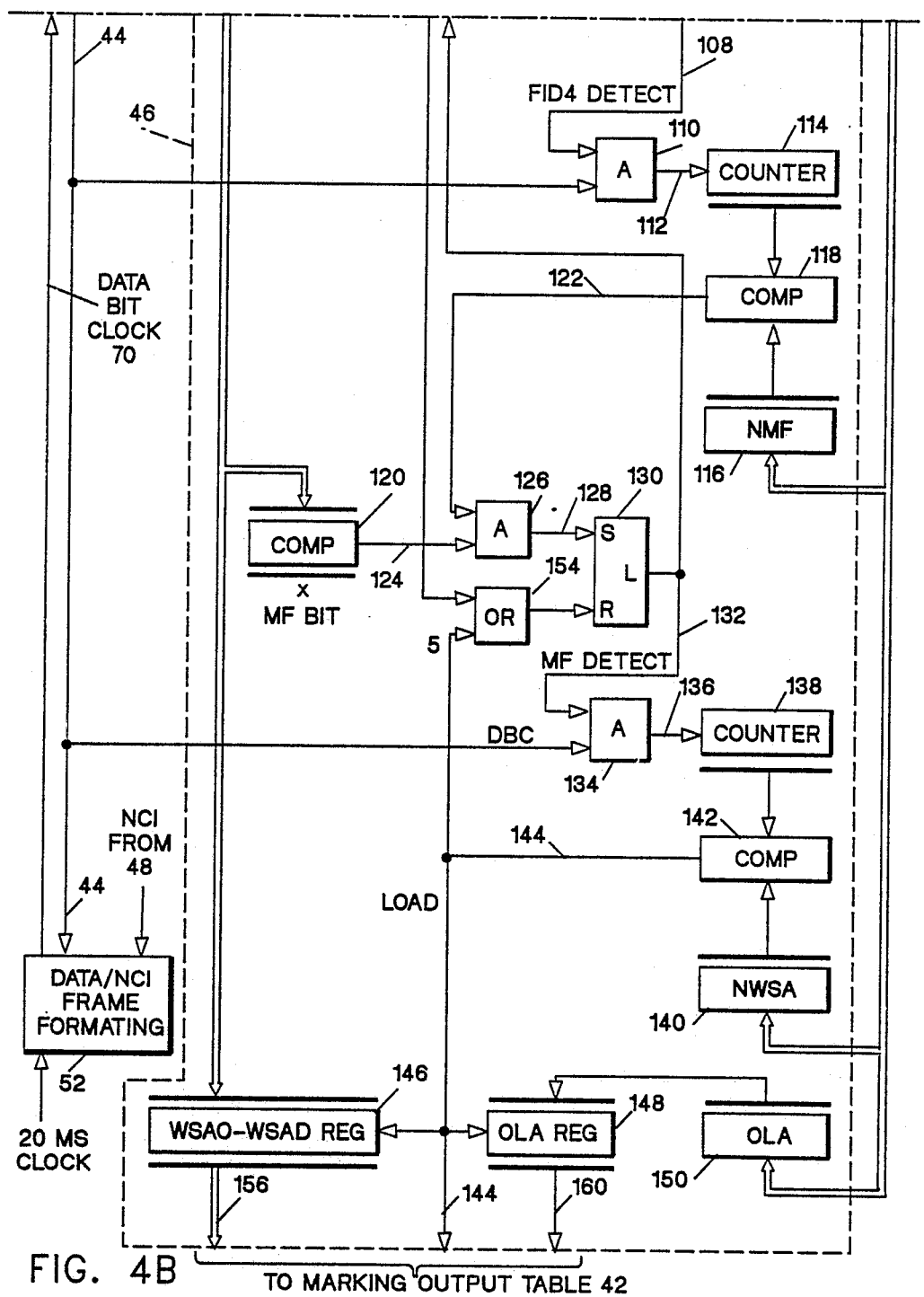
FIG. 4B  TO MARKING OUTPUT TABLE 42

NON-CODED INFORMATION AND COMPANION DATA SWITCHING MECHANISM

DESCRIPTION OF THE INVENTION

1. Field of the Invention

The present invention relates to a switching mechanism to be used in a communication network comprising a plurality of nodes which may be connected to pure data terminals and to intelligent workstations able to exchange data and non coded information NCI such as voice or images.

2. Background of the Invention

Intelligent workstations are able to transmit/receive data and non coded information which may be, as an example packetized compressed voice or images.

U.S. Pat. No. 4,535,448 describes a system providing the terminals with the capability of transmitting/receiving both voice data and pure packetized data. In this system, different types of interfaces are provided to allow the terminals to have access either to a packet bus dedicated to the exchange of packetized data or to a time division multiplex bus dedicated to the exchange of voice data.

The system described in this patent does not take advantage of the present communication network facilities since it requires dedicated means for pure data and voice and data handling.

SUMMARY OF THE INVENTION

An object of the invention is to provide an improved switching mechanism to be incorporated in the line scanners of future communication controllers or in an external adapter which may be added to the line adapters of existing communication controllers, said mechanism allowing the data resources of the communication controllers to be used for the routing of non coded information in a communication network.

The mechanism according to the invention allows data and packetized non coded information NCI, to be exchanged between workstations connected to nodes of a communication network, said node comprising data handling means (10) for establishing a session between any origin workstation and any destination workstation, and for routing the data to be exchanged between said workstations.

Each workstation comprises transmitting means (FIG. 8) for arranging the data bits and the NCI bits to be sent into a workstation bit stream format which comprises regular slots separated by delimitation flags (F1, F2), each slot being used to carry, data only bits, NCI only bits or NCI bits and data bits, the data only slots beginning with a first delimiting flag (F2) and the NCI only slots and the data and NCI slots beginning with a second delimiting flag (F1) followed by at least one NCI packet including the addresses of the origin and destination workstations involved in a session, the data portion, if any, following the NCI packet(s) beginning with the first flag (F2), and receiving means (FIG. 9) which are responsive to the detection of the delimitation flags to retrieve the data bits and NCI bits in the received bit stream, The network nodes comprise:
a high speed bus (26) onto which the NCI packets are exchanged,
marking means (46, 42) which record the addresses of the origin and destination workstations and the address of the node outbound link selected by the data handling means as a result of the initialization phase of a session which consists in sending routing data including the addresses of the said workstations,
selecting means (40) which are responsive to the addresses of the workstations contained in the NCI packets, which are sent once the session initialization is completed, to get the address of the selected outbound link for the session from the marking means, and generating a selection signal therefrom.

Each node inbound link comprises:
NCI receiving means (38),
separating means (34) receiving the bit stream to be sent by the origin workstation and responsive to the flag configurations for sending the data bits to the data handling means and the NCI packets to NCI receiving means,
scheduling means (39) for sending the NCI packets from the NCI receiving means to the high speed bus, Each network outbound link comprises:
NCI sending means (48),
gating means (50) which are responsive to the selection signal which is active when said outbound link is to be used for connecting the workstations involved in the session for transferring the NCI packets from the high speed bus to the NCI sending means,
formatting means (52) which receives the data bits from the data handling means (10) and the NCI packets from the output storing means (48) for arranging them into the workstation bit stream format.

BRIEF DESCRIPTION OF THE FIGURES

FIG. 2-A represents the NCI and data bit exchange format on the workstation link.

FIG. 2-B represents the NCI and data bit exchange format on an intermediate link.

FIG. 2-C represents the marking frame data structure on a workstation link.

FIGS. 3, 3A and 3B represents the block diagram of the external adapter incorporating the mechanism according to the invention.

FIGS. 4, 4A and 4B represents the block diagram of marking frame detector 46 of FIG. 3.

DETAILED DESCRIPTION OF THE INVENTION

Figure 1:
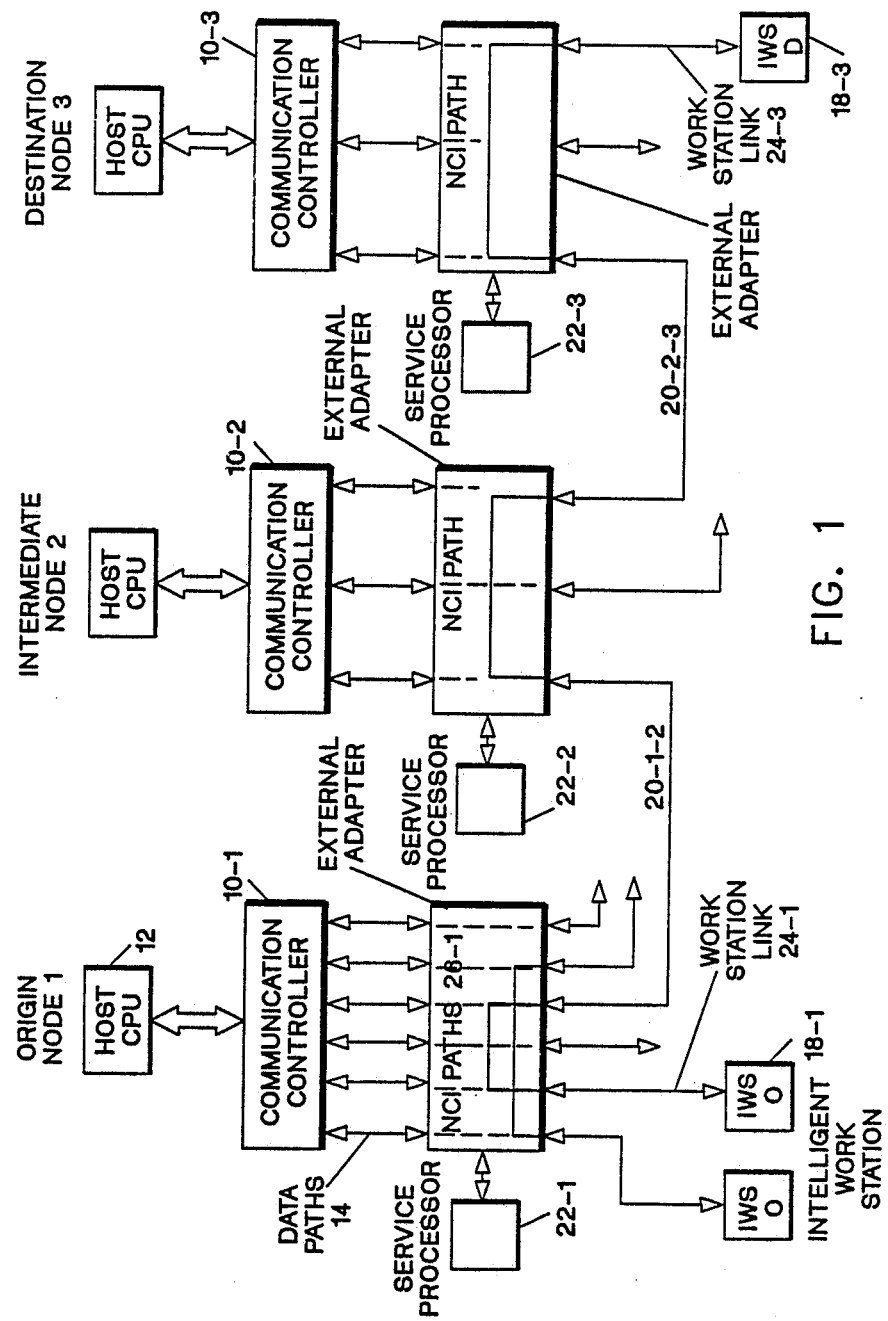
FIG. 1 schematically represents three nodes of a communication network in which the mechanism according to the invention may be incorporated.

FIG. 1 schematically represents a communication network in which the mechanism according to the present invention may be incorporated. The network comprises a plurality of nodes, only nodes 1, 2 and 3 are represented. The components in each node are referenced with numerals followed by suffixes representative of the node in which they are incorporated.

Each node comprises a communication controller 10, which may be an IBM 3725 Communication Controller, a host central processing unit CPU 12. The communication controller is connected to data paths 14 which are bidirectional links devoted to the transportation of data traffic. According to the invention, an external adapter 16 connects the data paths to the users which may comprise intelligent workstations IWS 18 and to intermediate node links 20. For example intermediate node links 20-1-2 connects node 1 to node 2. These intermediate node links are high speed time division multiplex links and are used for transporting the user information from one origin node to one destination node. The operation of external adapter 16 is controlled by service processor 22.

A specific embodiment of the invention will be described, assuming that the network is of the Systems Network Architecture SNA type. The formats of the messages which may be exchanged in a network of this type are described in the IBM Systems Network Architecture Reference Summary GA27-3136-4.

According to the invention, the data and NCI information from/to a workstation 18 are carried on workstation link 24 on the same channel, which insures a good channel utilization. NCI information packets are transparently carried between communication nodes on the intermediate node links, using the same route as data. Thus, the data and NCI information relative to the same workstation are said to be companion. The route is established through the regular network resources, which in the specific described environment comprise the communication controllers IBM 3725, network control program NCP, IBM 370 Central Processing Unit (CPU).

The use of this companion transport is made dynamic which means that a data session is first opened. This data session is established using the conventional data communication network resources for performing the routing and network management, like if the workstation were a conventional data terminal. Then, NCI transport can take place together with or without data. A data only transport phase takes place to close the session.

In each node, the NCI information is carried on the NCI paths 26 which are schematically represented in FIG. 1. An implementation of these paths will be described later on in more details.

This prevents the NCI information from being affected by the variable delays introduced by the data paths.

It is assumed that origin workstation 18-1 is to be connected to destination workstation 18-3. Each external adapters 16 in the boundary nodes 1 and 3 and in the intermediate node 2 are able to route the NCI packets from a given inbound link to the appropriate outbound link. For example, in node 1 inbound link is workstation link 18-1 and outbound link is intermediate node link 20-1-2.

The frame formats are represented in FIG. 2.

The NCI packets relative to a workstation are for instance voice packets at 8 kilobits per second and the intermediate link 20 is for instance a 64 kilobits per second link. Several voice packets form different workstations are multiplexed on the same intermediate links.

The sending workstations mix NCI packets or bunch of NCI packets with data at regular time intervals for instance at 20 millisecond intervals in order to minimize the delay distortion for one given origin and destination workstation couple. The NCI packets are delimited by starting flags F1 followed by the origin workstation address WSAO and the destination workstation address WSAD and then the NCI contents. The data packets are delimited by starting flags F2 followed by the user data stream. On a workstation link, there is only one NCI packet relative to the origin and destination workstation transmitted every 20 millisecond.

In a preferred embodiment of the invention F1 is chosen equal to the 7E hexadecimal flag (01111110 in binary notation) and F2 is chosen equal to 7F hexadecimal flag (01111111).

In order to avoid false F1 and F2 flag recognition, the NCI packets as well as the data packets are sent/received by the workstations using the conventional zero insertion/deletion techniques.

During a first phase, the origin workstation, for instance 18-1 sends data only, structured into frames delimited by flags F2 as shown in FIG. 2-C containing the routing information in the data fields. External adapter 16-1 recognize the F2 flags delete them and performs the zero deletion to regenerate the real data bit stream to be sent by the workstation like if it were a terminal directly connected to communication controller 10 without the external adapter 16.

During this first phase, the workstation acts exactly as a data only terminal and sends the appropriate data to a destination terminal handling data only inside the network.

Once this regular network routing procedure is completed, the destination workstation 18-3 is able to communicate with the origin workstation. Then both origin and destination workstations can exchange data only messages.

Phase 2 is now entered.

The origin workstation sends to the destination workstation a specific data information as shown in FIG. 2-B. This specific data information is:

seen as a regular data request/response unit RU by the node resources and then sent to the destination workstation.

thanks to a specific coding of a spare bit referenced as a marking frame bit MF and belonging to the transmission header TH field of the data frame, the frame is recognized by the external adapter as an NCI marking information. This specific bit has no effect on the regular SNA resources. The general format of the transmission header TH in the SNA architecture may be found in the above referenced document GA27-3136. They are six transmission header configurations which vary according to format identifier types FID. FID type 4 is the most currently used format identifier type. It is used for traffic between adjacent subarea nodes when both nodes support explicit and virtual routes. Transmission header of the FID 4 type comprises 25 bytes. The first four bits of byte 0 are coded to 0100 to identify FID 4 format, byte 1 comprises eight spare bits, byte 16 comprises one spare bit and byte 17 comprises eight spare bits.

On all links 14 coming from the communication controller 10, external adapter 16, must recognize, the NCI marking frame among all data frames it receives from the communication controller. To do so, external adapter 16 recognizes:

the FID 4 identifying bits 0100 in the first four bits of byte 0, since the origin workstation uses this format for its NCI marking frame and other pure data exchanges, and the marking frame bit MF.

If this marking frame bit MF is found ON, the origin workstation address and destination workstation address WSAO and WSAD which are part of the user data are stored in the external adapter together with the concerned outbound link 20-1-2.

Phase 3 is now entered.

Now external adapter 16 contains the NCI marking information and when it decodes the couple WSAO, WSAD it is able to route the NCI packets from the origin workstation to the appropriate outbound link, by performing a circuit switching in the adapter.

During this phase, the format on the workstation link is as shown in FIG. 2-A.

To insure a full duplex communication, the destination workstation answers by a data response unit RU and the operations performed in phases 2 and 3 to mark the route from origin workstation to destination workstation are performed to mark the route from destination workstation to origin workstation.

To close the session, a data only phase is entered to clear the NCI marking information.

It will now be described in reference to FIG. 3, the block diagram of an external adapter. For the sake of clarity, only the means relative to a communication from origin workstations to outbound links have been represented. However, in order to perform full-duplex communications, each link has to be provided with appropriate receiving or transmitting means as will be explained later on.

Figure 3B:
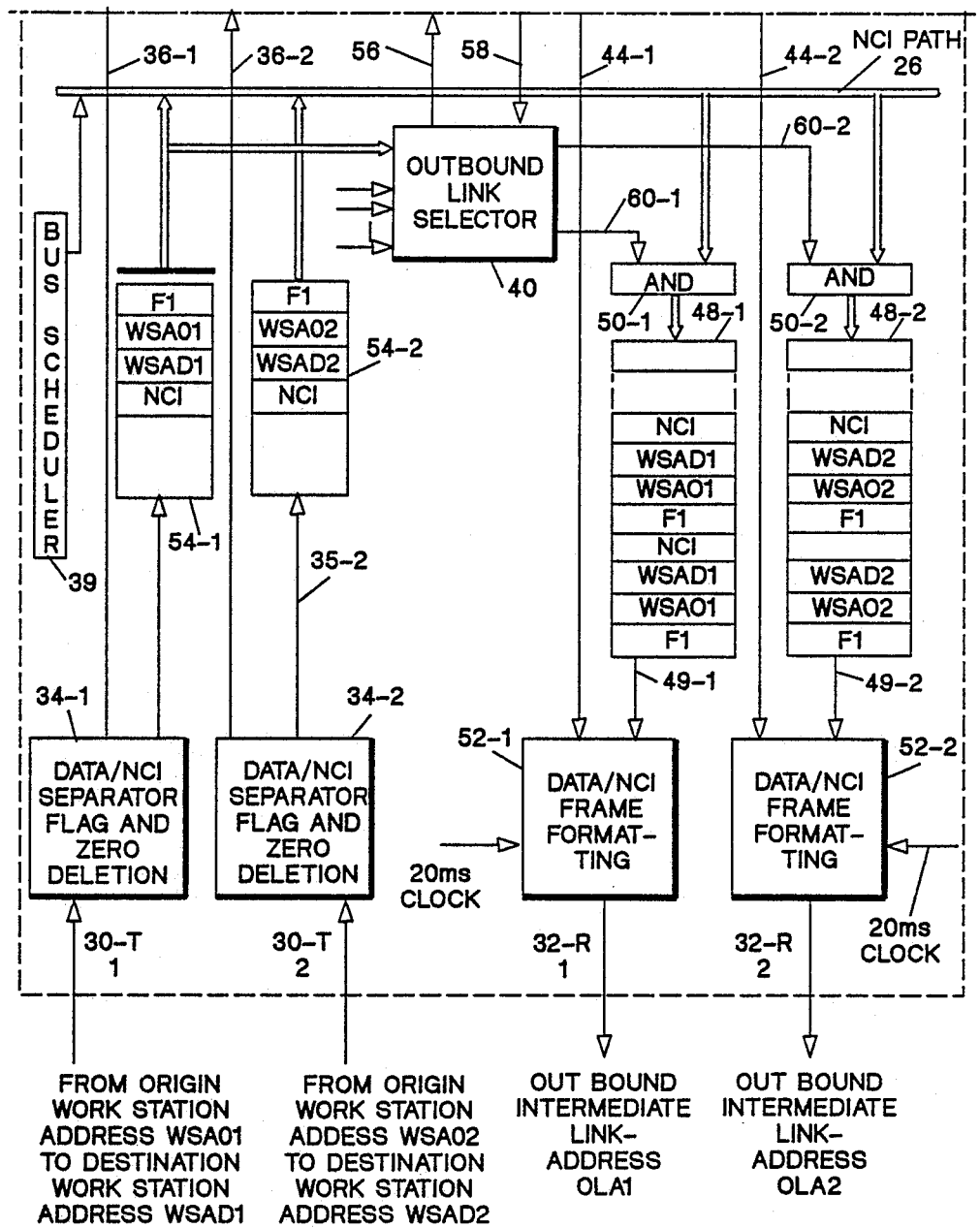

In FIG. 3, only the transmit interface 30-T of the workstation link 24 of FIG. 1 is shown. Two such interfaces are represented namely, interfaces 30-T1 and 30-T2 relative to two workstations. The address of the first workstation is referenced by WSAO1 and the address of the second workstation is referenced by WSAO2. It is assumed that a connection is to be established between these workstations with destination workstations the addresses of which are WSAD1 and WSAD2 respectively. These connections will be established using the procedure described above through the receiving interfaces 32-R1 and 32-R2 of outbound intermediate links 20. The outbound links are selected using the conventional network procedures, during the data only phase transport (phase 1) and have the outbound link addresses OLA1 and OLA2.

In this figure, the components interface have a general reference number and a suffix 1 or 2 which indicates that the component is involved in a connection initiated by the origin workstation having the address WSAO 1 or WSAO 2.

The interface 30-T is connected to input circuit 34 which separates the data and NCI information received from the workstation, delete the F2 delimitation flags inserted in the information flow by the workstation as shown in FIGS. 2-A to 2-C and delete the zeroes which were inserted in the data and NCI packets.

The data bits are sent to communication controller 10 though data input line 36 at the link clock rate. The NCI packets including the delimiting F1 flags, the address of the origin and destination workstations WSAO, WSAD and the NCI packets are stored in a first in-first out input memory memory 38. The information read out from memory 38 on bus 54 is provided to outbound link selector 40.

The F1, WSAO-WSAD fields and NCI packets which are read from memory 38 are provided to NCI path 26 under control of bus scheduler 39 to be routed to the appropriate outbound receive interface 32-R. The selection of the outbound receive interface is done by outbound link selector 40.

During the second phase of the session, marking output table 42 is loaded with the address couples WSAO-WSAD and the corresponding outbound link address OLA. Table 42 is a content addressable memory which is addressed by the WSAO-WSAD couples.

The output data line 44 is provided to marking frame detector 46 which retrieve in the data stream, from communication controllers 10 the address fields containing the address couples WSAO-WSAD. Thus, during the second phase of the above described process, detector 46 associated to each data output line 44 loads the table in memory 42. The NCI packets on bus 26 are provided to output first in-first out memory 48 through AND gate 50.

Output circuit 52 receives the data stream from output data line 44 and the information read from memory 48 under control of the 20 millisecond clock. Circuit 52 provides on the receive interface of the outbound intermediate link the data/NCI packets stream such as shown in FIGS. 2-A to 2-C. To do this, it adds the appropriate flags and performs the zero insertion function.

The address couples WSAO-WSAD read from input first in-first out memory 38 are provided to outbound link selector 40, through bus 54 which causes marking output table to be addressed through bus 56. The corresponding outbound link address OLA read from table 42 is provided to selector 40 through bus 58 and is used for providing a conditioning signal to the appropriate AND gate 50 through line 60.

As represented in FIG. 3, input FIFO memory 38 is used by only one workstation, thus during each 20 millisecond period, it only contains one NCI packet, whereas output FIFO memory 48 may contain NCI packets relative to a plurality of origin/destination workstation couples, since as described above, the intermediate links are multiplex links.

To insure full duplex communication, each workstation link 24 in FIG. 1 comprises transmit interfacing means 30, 34, 36, 38 and receive interfacing means which are similar to 46, 50, 48, 52. Each outbound link 20 in FIG. 3 comprises receive interfacing means 46, 50, 48, 52 and transmit interfacing means which are similar to 30, 34, 36, 38.

Marking frame detector 46 will now be described in reference to FIG. 4. It works under the control of the data link bit clock signal provided by output circuit 52 (as will be described later on in reference to FIG. 6) on line 70. The data bits on output data line 44 are inputted into one's counter 72 at the data bit clock rate. The content of counter 72 is compared by comparator 74 with the value six. The received data bit on line 44 is inverted in inverter 76. The output of inverter 76 and the output of comparator 74 are provided to AND gate 78. Thus AND gate 78 provides an active output signal when six ones followed by a zero have been detected in the data stream. The active output signal from AND gate 78 on line 80 set flag detection latch 82 and is used as general reset signal.

Output line 84 of latch 82 and data bit clock line 70 are connected to the inputs of AND gate 86. The output of AND gate 86 is provided to counter 88.

Thus when latch 82 is set, indicating that an SDLC f flag has been detected in the input data stream, counter 88 begins the data bit period counting. Comparator 90 compares the counter content with parameter NTH which indicates the beginning of the transmission header TH with respect to the end of the flag f (see FIG. 2-C). The value of parameter NTH is loaded into register 92 by external service processor 22.

The data bits on line 44 are inputted into 16-bit shift register 94. The content of register 94 is compared by comparator 96 with the FID 4 type bit configuration. The output line 98 of comparator 96 and the output line 100 of comparator 90 are provided to AND gate 102. When the output signal on output line 104 of AND gate 102 is active, i.e. when the FID 4 configuration has been detected in the transmission header, FID 4 detection latch 106 is set. The signal on output line 108 of latch 106 is provided to the reset input of f flag detection latch 82 and to one input of AND gate 110. The other input of AND gate 110 is connected to data bit clock line 70, thus AND gate 110 provides on its output line 112, the data bit clock pulses from the time when the FID 4 configuration has been detected. The output line 112 is provided to counter 114 which begins to count the data bit clock periods.

The content of counter 114 is compared with parameter NMF which indicates the position of the marking bit MF with respect to the end of the FID 4 configuration. This parameter is loaded into register 116 by service processor 22 and provided to comparator 118 together with the content of counter 114.

The content of register 94 is compared by comparator 120 with a masked configuration allowing the MF bit to be detected.

Output line 122 of comparator 118 and output line 124 of comparator 120 are provided to AND gate 126 which provides an active signal on its output line 128 when the MF bit is detected. This signal sets MF detection latch 130.

Output line 132 of latch 130 and data bit clock line 44 are provided to AND gate 134, which thus provides on its output line 136 the data bit clock signal to counter 138. From the time when MF bit is detected, counter 138 begins to count the data bit clock periods. The content of counter 138 is compared by comparator 142 with parameter NWSA which is loaded in register 140 by external processor 22.

Parameter NWSA indicates the position of the address fields with respect to the position of the MF bit. Thus, when an equality is detected by comparator 142, a load control signal is provided on output line 144. This pulse causes the content of register 94 to be loaded into WSAO-WSAD register 146 and the corresponding outbound link address OLA to be loaded in register 148.

The OLA parameter is contained in register 150 in which it is loaded by service processor 22.

Latch 82 is reset by the output signal on output line 108 of FID 4 detection latch 106. Latch 106 is reset by the general reset signal on output line 80 of AND gate 78 or by the signal on output line 132 of latch 130. To do this, line 80 and line 132 are provided to the inputs of OR gate 152, the output line of which is provided to the reset input of latch 106. Latch 130 is reset by the general reset signal on line 80 or by the signal on output line 144 of comparator 142. To do this, lines 80 and 144 are provided to the inputs of OR gate 154, the output line of which is provided to the reset input of latch 130.

Marking output table 42 and its peripheral circuits will now be described in reference to FIG. 5.

Contention resolution circuit 180 receives the load signals generated on lines 144 of the marking frame detectors 46 of the external adapter.

It generates on one of its output lines 182, a selection signal which is active to perform the updating of output marking table 42 for a specific interface 32.

AND gates 184 are conditioned by the selection signals on lines 182 for gating the content of WSAO-WSAD registers 146 provided from busses 156 shown in FIG. 4. The output busses 186 of AND gates 184 are provided to OR gate 188, which provides on its output bus 190, the WSAO-WSAD information to be stored in table 42.

AND gates 192 are also conditioned by the selection signals on line 182 for gating the content of OLA registers 148 provided from bus 160 (FIG. 4) to their output busses 194. The output busses 194 are provided to OR gate 196 which transfers the content of the selected OLA register 148 to marking output table 42 for updating.

The selection signals on lines 182 are provided to OR gate 200, the output signal of which on line 202 activates counter address sequencer 204. Counter address sequencer provides on its output bus 206, the address of the position in table 42 at which the WSAO-WSAD and corresponding OLA information has to be written.

Table 42 is read under control of circuit 40 (FIG. 3) which receives the information from the input first in-first out memories 38. The information read from these memories on busses 54 are provided to addressing circuit 208 which recognize the F1 flags preceding the WSAO-WSAD fields.

Figure 5:
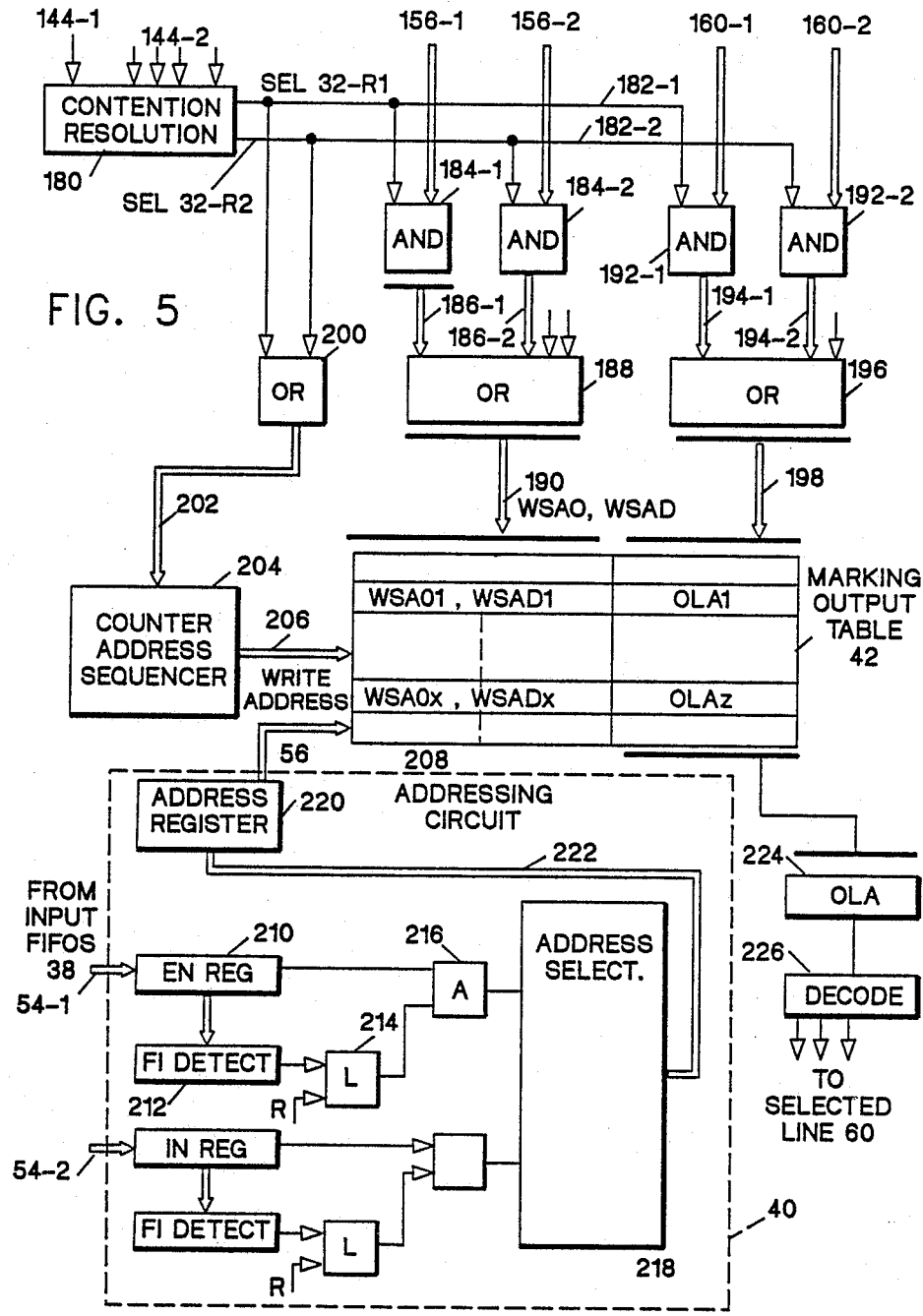
FIG. 5 represents the block diagram of marking output table 42 of FIG. 3.

As schematically shown in FIG. 5, addressing circuit 208 comprises for each inbound link 30, input register 210 into which the information read from first in-first out memory 38 is inputted from bus 54. Circuit 212 detects whether register 210 contents a flag F1 or not. If yes latch 214 is set in order to condition AND gate 216 during the time the following fields WSAO-WSAD are read. During this time the content of register 210 is provided to address selector 218.

Address selector 218 selects one of the address couples WSAO-WSAD provides by the AND gates, which is inputted into memory address register 220 by means of bus 222. Thus input address register provides on bus 56, the address of the memory location, to be read. The corresponding OLA address is provided to register 224, decoded into decoder 226 which provides on one of its output lines 60, a signal which is active to condition the appropriate AND gate 50 (FIG. 3).

Input circuit 34 will now be described in reference to FIG. 6. This circuit performs the data and NCI separation function and deletes the F2 flags and the zero following five ones.

The bit stream received from inbound link 30 is inputted to shift register 240. The content of register 240 is compared with F1 and F2 flag patterns in circuits 242 and 244. The bit stream which is shifted out register 240 on line 246 is provided to zero deletion circuit 248 the function of which is to delete the zero following five ones. This operation is inhibited when the F1 and F2 flags are detected by means of OR circuit which receives the output signals from circuits 242 and 244 and provides on its output line an inhibit signal which is active to inhibit the zero deletion function.

The active output signal from circuit 242 on line 254 sets latch 256, which thus provides an active signal on its output 258 during the periods corresponding to NCI received bits.

The active output signal from circuit 244 on its output line 245 is provided to latch 260, which thus provides an active signal on its output 262 during the periods corresponding to data received bits.

The bit stream from zero deletion circuit on line 264 is provided to AND gates 266 and 268 which are conditioned by the NCI and data period signals on lines 258 and 262 respectively.

Latch 256 is reset by the active signal on line 245 and latch 260 is reset by the active signal on line 254.

The active output signal from circuit 244 sets latch 270 which is reset eight bit later, so as to provide on its output line 272, a signal which is active during the F2 flag periods. This signal is inverted in inverter 274.

The link clock is provided to AND gate 278 which is conditioned by the active signal on data period line 262 and the active signal on output line 280 of inverter 274. AND gate 278 provides the data clock bit signal on its output line 282 during the data only periods. This signal controls the sending of the data bits to communication controller 10.

The F1 flags, WSAO and WSAD fields and the NCI packets are provided to first in first out memory 38 by AND gate 266. The data bits are provided to communication controller 10 by AND gate 278.

Output circuit 52 will now be described in reference to FIG. 7. This circuit generates the data and NCI bit stream on outbound link 32-R.

The information read from the output first in-first out memory 48 is provided to input register 300, the content of which is shifted at the outbound link clock rate and is provided through line 302 to one input of AND gate 304. AND gate 304 is conditioned when there is an active signal on its second input line 306. This signal is generated by NCI packet control circuit 308 which controls the unloading of output first in-first out memory 48. At each 20 millisecond periods, it allows the memory content to be unloaded and then a data period to be entered. Thus it provides a signal which is active during the NCI periods on line 306 and a signal which is active during the data periods on line 310.

When signal on line 310 becomes active, latch 312 is set during eight bit periods, and provides an active output signal on its output line 314 which activates F2 insert circuit 316.

Data period signal on line 310, the link clock signal on line 318 and the output signal from latch 312 inverted in inverter 320 are provided to AND gate 322, which thus provides on its output line 70, the data bit clock signal which controls the sending of the data bits from communication controller 10 and the operation of marking frame detector 46. The data bit stream from controller 10 on line 44 are provided to one input of OR gate 324 at the rate of the data bit clock on line 70. The second input of OR gate 324 is connected to output line 326 of AND gate 304. Thus OR gate 324 provides the data and memory 48 content during the appropriate periods, to zero insertion circuit 328.

Output line 330 of circuit 328 is connected to one input of OR gate 332.

When latch 312 is set, indicating that a data period is entered, flag F2 is sent by F2 flag insert circuit 316 on the second input line 334 of OR gate 332. Thus OR gate 332 provides on the outbound link 32-R, the data and NCI stream as described in reference to FIGS. 2-A to 2-C.

F1 flag configuration in the information read from memory 48 is detected by circuit 334. The output signal from of circuit 334 sets latch 335 which provides on its output line 336 an inhibit signal which prevents a zero to be inserted by circuit 328 when flag F1 is read from memory 48 to be sent to outbound link 32-R.

In addition to the conventional data and NCI handling means, the workstations comprise transmitting means (represented in FIG. 8) for generating the bit stream to be sent to the transmit interface 30-T of the node inbound link and receiving means (represented in FIG. 9) for retrieving the data and NCI bits from the bit stream on the receive interface of node outbound link 30-R. The conventional data and NCI handling means are not shown in FIGS. 8 and 9.

Figure 6:
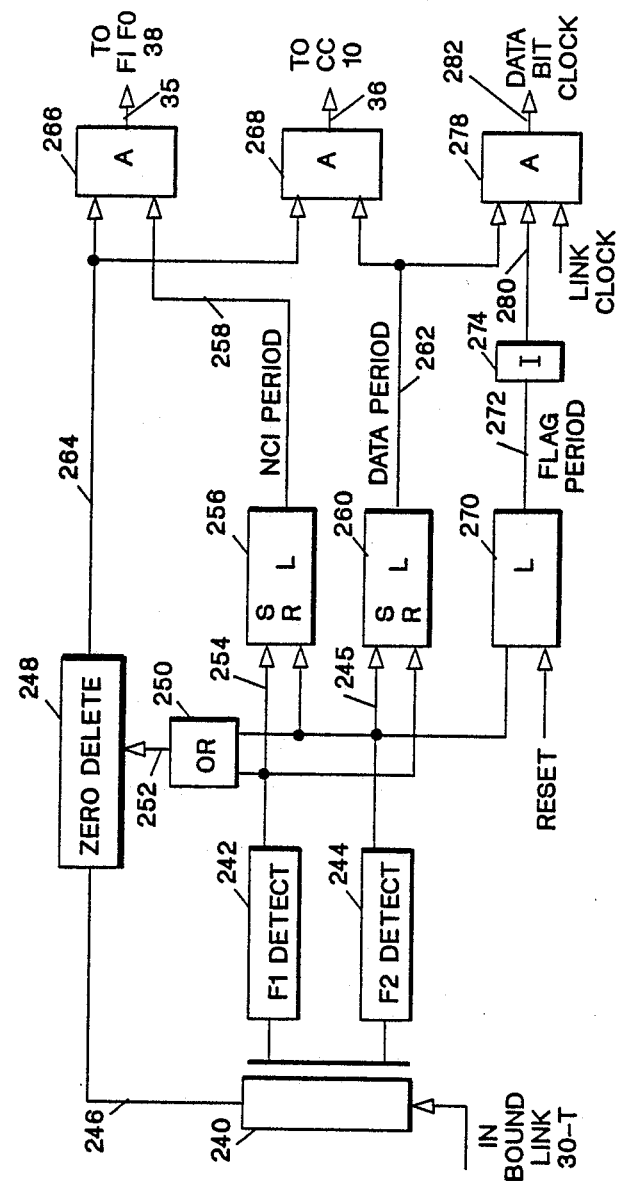
FIG. 6 represents the block diagram of input circuit 34 of FIG. 3.
Figure 7:
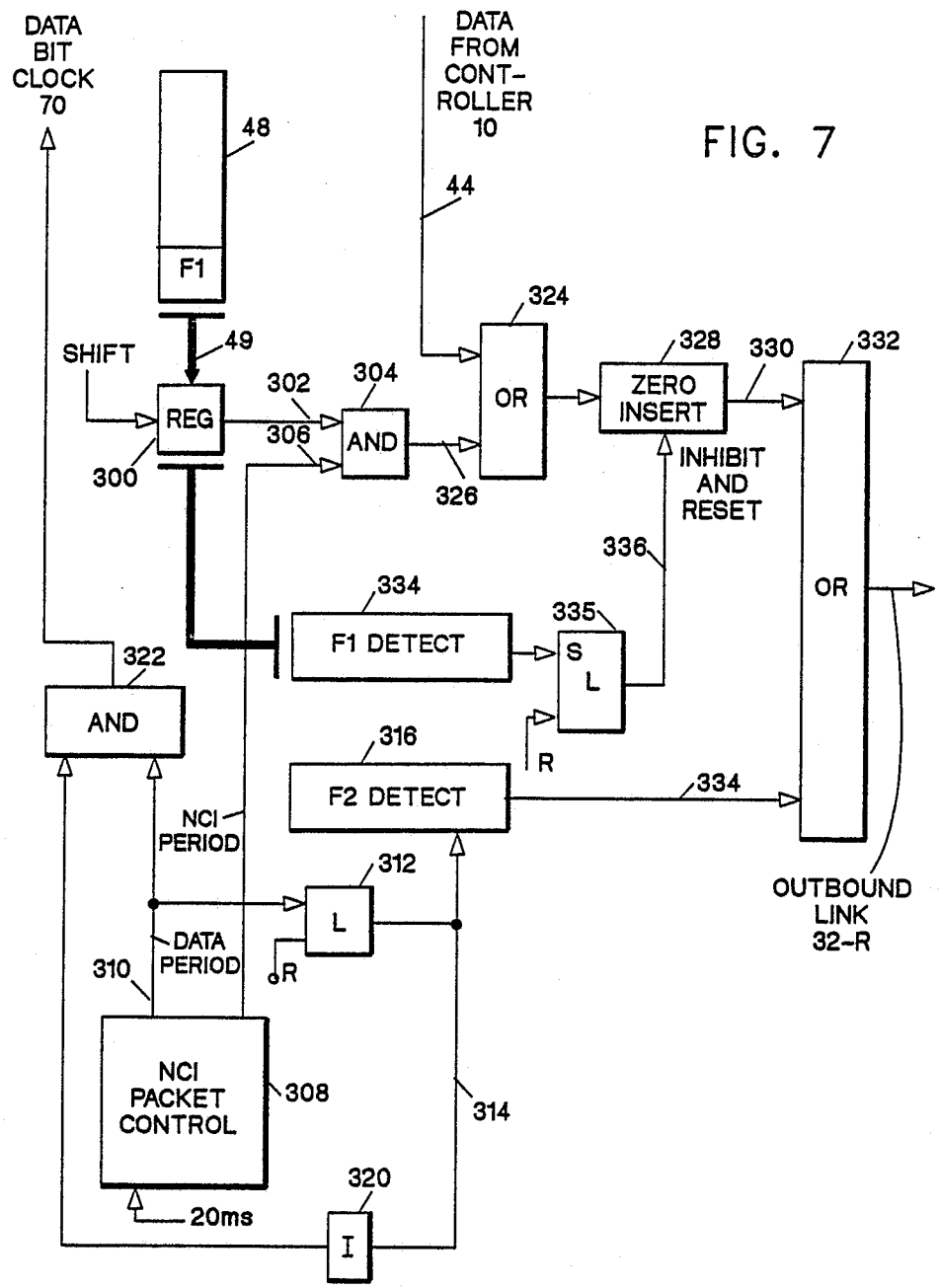
FIG. 7 represents the block diagram of output circuit 52 of FIG. 3.
Figure 8:
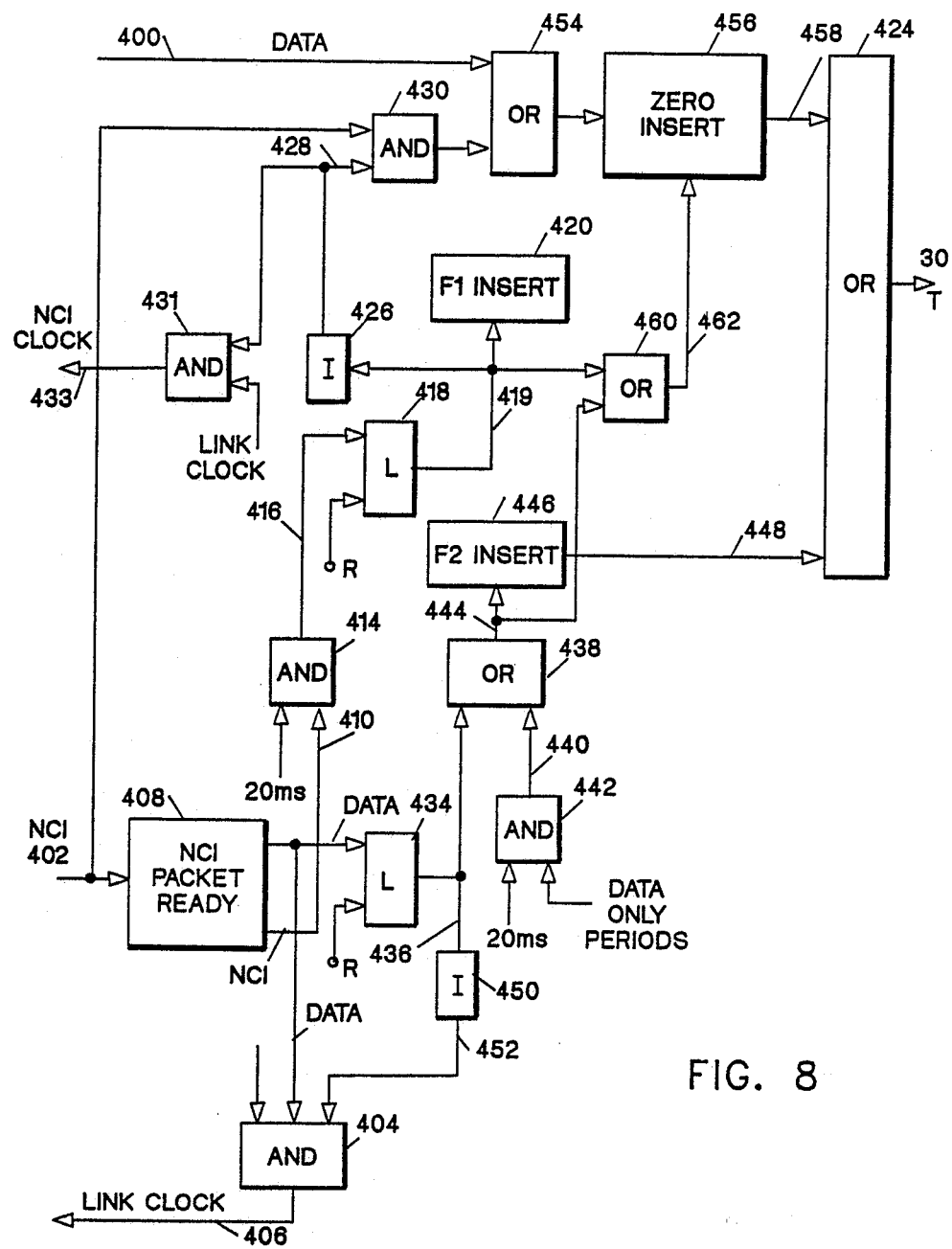
FIG. 8 represents the block diagram of the transmitting means in the workstation allowing the bit stream described in FIGS. 2-A and 2-C to be generated.
Figure 9:
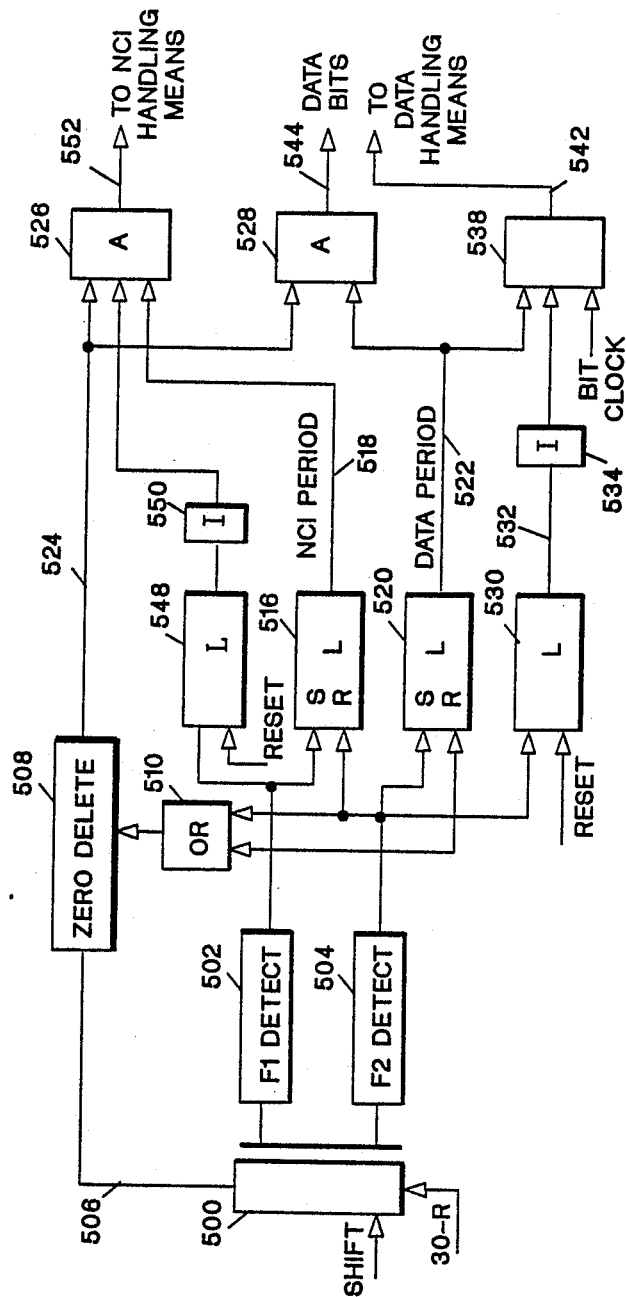
FIG. 9 represents the block diagram of the receiving means in the workstation allowing the data and NCI information to be retrieved from the bit stream described in FIGS. 2-A and 2-C.

The transmitting means shown in FIG. 8 are similar to circuit 52 shown in FIG. 7 since they substantially perform the same function, and the receiving means shown in FIG. 9 are similar to circuit 34 shown in FIG. 6 since they substantially perform the same function.

The transmitting means shown in FIG. 8 comprises data and NCI lines 400 and 402 which receive the data bit stream and the NCI packets to be arranged into the stream shown in FIGS. 2-A to 2-C.

The data bits are provided on line 400 at the rate of the link clock signal generated on output line 406 of AND gate 404.

The NCI packets are provided to circuit 408 which generates on output line 410 a signal which is active when there is a NCI packet ready to be transmitted and a signal on output line 412 when no NCI packet is ready which corresponds to a data period.

AND gate 414 is conditioned by the active signal on output line 410, at the next 20 millisecond period. The active signal on output line 416 sets latch 418 which remains set during eight bit periods and is then reset. The active signal on output line 419 of latch 418 activates F1 insert circuit 420 which causes the F1 flag to be sent to input line 422 of OR circuit 424.

Output line 419 of latch 418 is provided to inverter 426, output line 428 of which is provided to one input of AND gate 430, which is thus conditioned, when NCI packets have to be sent after the flag F1 insertion. The second input line of AND gate 430 is line 402. Thus AND gate 430 provides on its output line 432, the NCI packets to be sent on interface 30-T, at the link clock rate. To do so, the link clock signal is provided to AND gate 431 which is conditioned by the output signal from latch 426, and which provides on its output line 433, the NCI clock signal.

When the signal on data period line 412 is active, latch 434 is set, and remains set during eight bit periods. The output line 436 of latch 434 is provide to one input of OR gate 438. The second input of OR gate 438 is connected to output line 440 of AND gate 442. AND gate 442 is conditioned during the data only period to provide an active signal on its output line 440 at each 20 millisecond period. Thus OR gate provides an active output signal on line 444 when F2 flags have to be inserted as shown in FIGS. 2-A and 2-C.

This signal activates F2 flag insert circuit 446 which causes the F2 flag to be sent to input line 448 of OR gate 424.

The output signal from latch 434 is inverted in inverter 450, and output line 452 of inverter 450 is provided to one input of AND gate 404. Thus AND gate 404 is conditioned during the data period when flag F2 is not to be inserted to provide on its output line 406, the link clock signal at which rate the data bits are sent to line 400.

The data bits on line 400 and the NCI packets on line 432 are provided through OR gate 454 to zero insert circuit 456, which provides on its output line, the data and NCI packets to input line 458 of OR gate 424.

The zero insertion function of circuit 456 is inhibited, when F1 and F2 flags have to be sent. This is done by the inhibit signal which is provided by OR gate 460 on line 462. The input lines of OR gate 460 are lines 419 and 444 which provide active signals when the flags have to be inserted in the bit stream, to be sent on interface 30-T.

Thus OR gate 424 provides on its output line 30-T, the bit stream shown in FIGS. 2-A and 2-C.

As shown in FIG. 9, the bit stream received by a workstation on interface 30-R is provided to input shift register 500.

The content of register 500 is compared with F1 and F2 flag patterns in circuits 502 and 504. The bit stream which is shifted out register 500 on line 506 is provided to zero deletion circuit 508 the function of which is to delete the zero following five ones. This operation is inhibited when the F1 and F2 flags are detected by means of OR circuit 510 which receives the output signals of 502 and 504 and provides on its output line an inhibit signal which is active to inhibit the zero deletion function.

The active output signal from circuit 502 on line 514 sets latch 516, which thus provides an active signal on its output 518 during the periods corresponding to NCI received bits.

The active output signal from circuit 504 on its output line 515 is provided to latch 520, which thus provides an active signal on its output 522 during the periods corresponding to data received bits.

The bit stream from zero deletion circuit 508 on line 524 is provided to AND gates 526 and 528 which are conditioned by the NCI and data period signals on lines 518 and 522 respectively.

Latch 516 is reset by the active signal on line 515 and latch 520 is reset by the active signal on line 514.

The active output signal from circuit 504 sets latch 530 which is reset eight bit later, so as to provide on its output line 532, a signal which is active during the F2 flag periods. This signal is inverted in inverter 534.

The bit clock is provided to AND gate 538 which is conditioned by the active signal on data period line 522 and the active signal on output line 540 of inverter 534. AND gate 538 provides the data clock bit signal on its output line 542. This signal controls the sending of the data bits from output line 544 of AND gate 528 to the data handling means of the workstation.

AND gate 526 has a third input line 546. This line is activated when a F1 flag is detected by circuit 502. To do this, latch 548 is set when F1 flags are detected and reset eight bit periods later, latch 548 provides an output signal which is inverted in inverter 550. Inverter 550 provides on its output line 546, the inhibit signal to AND gate 526.

Thus AND gate 536 provides on its output line 552 the NCI packet bits which are sent to the NCI handling means of the workstation.

We claim:

1. Mechanism allowing data and packetized non-coded information NCI, to be exchanged between workstations connected to nodes of a communication network and having node inbound and outbound and network inbound and outbound links interconnecting said nodes and workstations, said nodes comprising data handling means (10) for establishing a session between any origin workstation and any destination workstation, and for routing the data to be exchanged between said workstations characterized in that each workstation comprises:

transmitting means (FIG. 8) for arranging the data bits and the NCI bits to be sent into a workstation bit stream format which format comprises regularly occurring time slots separated by delimination flags types, F1 and/or F2, each slot being used to carry data only bits or NCI only bits or NCI bits and data bits, the data only carrying slots beginning with a first type delimiting flag F2 and the NCI only carrying slots and the data and NCI slots beginning with a second type delimiting flag F1 followed by at least one NCI packet including the addresses of the origin and destination workstations involved in a session, the data portion, if any, following said at least one NCI packet beginning with the first type delimiting flag F2, receiving means (FIG. 9) which are responsive to the detection of the delimitation flags to retrieve the data bits and NCI bits in the received bit stream, the network nodes comprise:

a high speed bus (26) onto which the NCI packets are exchanged, marking means (46, 42) which record the addresses of the origin and destination workstations and the address of a node outbound link selected by the data handling means as a result of the initialization phase of a session which consists in sending routing data including the addresses of the said workstations, selecting means (40) which are responsive to the addresses of the workstations contained in the NCI packets, which are sent once the session initialization is completed, to get the address of the selected outbound link for the session from the marking means, and generating a selection signal therefrom, and each said node inbound link comprises:

NCI receiving means (38), separating means (34) receiving the bit stream to be sent by the origin workstation and responsive to the flag configurations for sending the data bits to the data handling means and the NCI packets to the NCI receiving means, scheduling means (39) for sending the NCI packets from the NCI receiving means to the high speed bus, each said network outbound link comprises:

NCI sending means (48), gating means (50) which are responsive to the selection signal which is active when said outbound link is to be used for connecting the workstations involved in the session, for transferring the NCI packets from the high speed bus to the NCI sending means, formatting means (52) which receives the data bits from the data handling means (10) and the NCI packet from the NCI sending means (48) for arranging them into the workstation bit stream format.

2. Mechanism according to claim 1, characterized in that the first flag (F2) is equal to 01111111 and the second flag (F1) is equal to 01111110, and unintended or accidentally occurring false flag simulations occurring naturally at random by coincidence in the data bit stream and NCI packets to be sent or received by the workstations are prevented by inserting a zero after five consecutive ones.

3. Mechanism according to claim 2, characterized in that the separating means (34) comprises:
- means (240, 242, 244) for receiving the bit stream from the inbound link, said means being responsive to the detection of the flag configurations for generating a first signal which is active during the data period of the bit stream and a second signal which is active during the NCI periods of the bit stream,
- zero deleting means (248) for deleting the zero following five consecutive ones,
- gating means (266, 268, 278) responsive to the first and second signals for routing the bit stream from the zero deleting means either to the data handling means or to the input storing means depending upon which one of said first and second signal is active.

4. Mechanism according to claim 3 characterized in that the formatting means comprises:
- means (300) for receiving the NCI packets from the output storing means,
- control means (308) responsive to the detection that the output storing means contain no more NCI packets and to a clocking signal provided at each slot period for generating a third signal which is active during the data period of the bit stream to be sent on the node outbound link and a fourth signal which is active during the NCI period of said bit stream,
- gating means (304, 322, 324) which are responsive to the third and fourth signals for providing the data bits and NCI packet bits from the data handling means and from the output storing means at their output,
- zero inserting means (328) which receive the bit stream from the output of the gating means for inserting in said stream a zero after five consecutive ones,
- flag generation means (334, 316),
- output gating means (332) for sending the bit stream provided by the zero inserting means or the flags for separating the slots and the data and NCI portions.

5. Mechanism according to any one of claims 1 to 4 characterized in that the marking means comprises for each outbound link,
- detecting means (46) responsive to the data bit stream which is sent by the data handling means during the initialization phase of the session, for correlating the addresses (WSAO-WSAD) of the workstations involved in said session with the address of the selected outbound link (OLA)
- and a content addressable memory (42) in which the detecting means causes the workstation addresses and the correlated address of the outbound link to be recorded.

6. Mechanism according to any one of claims 1 to 4 characterized in that the NCI receiving means are first in-first out memories, in which are inputted the second flag, and the NCI packets including the addresses of the workstations involved in a session.

7. Mechanism according to claim 6 characterized in that the NCI sending means are first in-first out memories.

8. Mechanism according to any one of claims 1 to 4 characterized in that on the workstation links, the regular slot comprises only one NCI packet, and on the node intermediate links, the regular slots may comprise a plurality of NCI packets related to different sessions.

* * * * *